US012712324B2

(12) United States Patent
Komar et al.

(10) Patent No.: US 12,712,324 B2
(45) Date of Patent: Aug. 18, 2026

(54) PLUG CONNECTION SYSTEM, AND ELECTRIFIED MOTOR VEHICLE WITH SUCH A PLUG CONNECTION SYSTEM

(71) Applicant: Lisa Dräxlmaier GmbH, Vilsbiburg (DE)

(72) Inventors: Florian Komar, Velden (DE); Stefan Wimmer, Hohenthann (DE); Simon Eggl, Hohenthann (DE); Friedrich Staudinger, St. Wolfgang (DE); Robert Saller, Egglkofen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 348 days.

(21) Appl. No.: 18/634,161

(22) Filed: Apr. 12, 2024

(65) Prior Publication Data

US 2024/0364060 A1 Oct. 31, 2024

(30) Foreign Application Priority Data

Apr. 26, 2023 (DE) ..................... 10 2023 110 642.2

(51) Int. Cl.

| | |
|---|---|
| ***H01R 13/11*** | (2006.01) |
| ***H01R 13/424*** | (2006.01) |
| ***H01R 13/53*** | (2006.01) |
| ***H01R 25/14*** | (2006.01) |

(52) U.S. Cl.

CPC ........... *H01R 25/142* (2013.01); *H01R 13/11* (2013.01); *H01R 13/424* (2013.01); *H01R 13/53* (2013.01); *H01R 2201/26* (2013.01)

(58) Field of Classification Search

None

See application file for complete search history.

(56) References Cited

U.S. PATENT DOCUMENTS

| | | | | |
|---|---|---|---|---|
| 10,505,291 | B2 * | 12/2019 | Ozaki | H01B 7/0009 |
| 2013/0196545 | A1 | 8/2013 | Adachi et al. | |
| 2017/0250510 | A1 * | 8/2017 | Niedermeier | H01R 13/68 |

FOREIGN PATENT DOCUMENTS

| | | | | |
|---|---|---|---|---|
| CN | 115331869 A * | 11/2022 | | H02G 5/002 |
| DE | 102021112304 A1 | 11/2022 | | |
| WO | WO-2023036564 A1 * | 3/2023 | | H01R 13/521 |
| WO | 2023051763 A1 | 4/2023 | | |

* cited by examiner

*Primary Examiner* — Tho D Ta

(74) *Attorney, Agent, or Firm* — Burris Law, PLLC

(57) ABSTRACT

A plug connection system for the mechanical and electrical connection of flat conductors, in particular of a high voltage direct current connection in a battery electric motor vehicle, includes a plug part and a socket part. The socket part includes two socket contacts arranged in parallel. The plug part includes a housing through-feed for two parallel flat conductors with their flat sides facing each other. The flat conductors in the plug part and the socket contacts in the socket part are configured to be connected by parallel contact rails whose cross-section contour respectively corresponds to the cross-section contour of a flat conductor.

13 Claims, 4 Drawing Sheets

PLUG CONNECTION SYSTEM, AND ELECTRIFIED MOTOR VEHICLE WITH SUCH A PLUG CONNECTION SYSTEM

CROSS-REFERENCE TO RELATED APPLICATIONS

This application is claims priority to and the benefit of DE 10 2023 110 642.2 filed on Apr. 26, 2023. The disclosures of the above applications are incorporated herein by reference.

FIELD

The present disclosure relates to a plug connection system. The present disclosure further deals with an electrified motor vehicle with such a plug connection system.

BACKGROUND

The statements in this section merely provide background information related to the present disclosure and may not constitute prior art.

In modern battery electric vehicles, high standards are placed on the connections, in particular between high voltage battery and power electronics. A particularly good electrical stability of the connections is desired for the high voltages used. At the same time, the connections must be mechanically robust in order to avoid an unintentional disengagement. There is also a concern if the connections are not sufficiently fluid-tight. In this respect, high demands are also placed here on tightness.

Previous solutions usually use cable-like conductors that have a round cross-section and are provided with a thick electrical and mechanical insulation. In contrast, newer developments tend to use flat conductors that have advantages with respect to their mechanical stability. In a similar installation space two flat conductors can be guided in parallel, which leads to a good compactness overall.

Every electrical conductor generates an electromagnetic field that is desired to classify with high voltage applications, such as in battery electric vehicles. Correspondingly high demands are placed on the electromagnetic compatibility. The International Commission on Non-Ionizing Radiation Protection (ICNIRP) creates standards for this and issues guidelines in order to reduce the effects of electromagnetic interference on people.

With the development of connections between a high voltage battery and a power electronics unit in battery electric vehicles by flat conductors it has been shown that at the connection points, which are often embodied as plug contacts or screw contacts, increased electromagnetic radiations must be measured. There is therefore a risk that the guidelines of the ICNIRP cannot be complied with at certain points in the electrical conduction path.

SUMMARY

This section provides a general summary of the disclosure and is not a comprehensive disclosure of its full scope or all of its features.

The present disclosure provides specifying a plug connection system for, in one form, use in a high voltage direct current connection of a battery electric motor vehicle. The plug connection system has a good electromagnetic compatibility and high current-carrying capacity. The present disclosure further provides an electrified motor vehicle, in one form a battery electric motor vehicle, with such a plug connection system.

The present disclosure is thus based on the idea of specifying a plug connection system for the mechanical and electrical connecting of flat conductors, in particular of a high voltage direct current connection in a battery electric motor vehicle, with a plug part, and a socket part, that includes two socket contacts arranged in parallel. The plug part includes a housing feed-through for two flat conductors routed in parallel, arranged with their flat sides arranged opposite one another. The flat conductors can be connected or are connected in the plug part, and the socket contacts in the socket part, by parallel contact rails whose cross-section contour respectively corresponds to the cross-section contour of each flat conductor.

The contact rails are, in one form, integrated in the plug part, and form the corresponding plug contacts that may interact with the socket contacts. The connection between plug part and socket part is affected primarily in a clamping manner, whereby a good mechanical and simultaneously stable electrical connection is produced.

The present disclosure provides that the electromagnetic compatibility is improved. The parallel contact rails are particularly responsible for this, since they provide that the entire electrical conduction path remains parallel. In this context it should be noted that "parallel contact rails" is understood to mean an orientation of the contact rails with respect to each other, and a design of the contact rails that provides that the contact rails run parallel to each other over their entire length. In particular, the parallelism of the contact rails is maintained even with deflections and/or offsets.

The parallelism of the contact rails, and thus the parallelism of electrical conductors across the plug part into the socket part, and in one form across the entire plug connection system, has surprisingly been shown as particularly effective for reducing the electromagnetic radiation. It is assumed that due to the continuous parallelism of the electrical conductors, corresponding electromagnetic fields are mutually cancelled out, which is significantly below the ICNIRP limits.

The continuously maintained cross-section contour of the flat conductor that continues in the contact rails also provides a good electromagnetic compatibility, but also causes the current carrying capacity of the plug connection to be especially high. Ohmic resistances that exist in other plug connection systems known from the prior art are thus reduced. This reduces the electrical losses.

In one form of the present disclosure, each contact rail includes a conductor-side end and a socket-side end. The conductor-side end is firmly connected with a flat conductor, in one variation welded. The socket-side end may be plugged and/or clamped to the respective socket contact. Due to the firm connection with the flat conductor, a high mechanical and electrical stability is achieved. This applies when the connection is made by welding. The respective socket-side ends of the contact rails form essentially flat plugs that can be plugged together with the socket contacts. The plug-in connection and/or clamped connection makes possible a good contact between plug part and socket part, in which additional connections that are expensive in the assembly, such as screw connections, may be omitted. This accelerates the assembly and leads overall to a cost savings.

The conductor-side end can be aligned at right angles to the socket-side end of the contact rail. In one form an angle connection between two electrical conductor paths may be easily shaped, in which the parallelism of the electrical conductors can simultaneously be maintained along their entire conductor path. In addition, this angled arrangement of the conductor-side end and the socket-side end increases the stability of the contact rail. While plugging together the plug part and the socket part, plugging forces act on the plug part, an excess of which could lead to a deformation of the flat conductor. By the plug-side end being arranged at right angles to the conductor-side end of the contact rail, these forces can be transmitted in an improved manner, and a deformation of the flat conductor and/or of the contact rails is avoided.

In order to achieve a right-angle arrangement of conductor-side end and socket side end of the contact rail, in one variation an L-shaped deflection section is arranged between the conductor-side end and the socket-side end of the contact rail. The L-shaped deflection section has a plurality of advantages. On the one hand, the L-shaped deflection section is easy to manufacture and stable, in particular for the transmission of plugging forces. On the other hand, the L-shaped deflection section maintains the cross-sectional contour of the flat conductor and the parallelism of the two contact rails with respect to each other. This contributes to the improvement of the electromagnetic compatibility and current carrying capacity.

In one variation of the present disclosure, the contact rail is formed as a stamped and bent part, in particular made of copper or comprising copper. The use of a stamped and bent part facilitates the contact rail to be manufactured in large series at low costs per unit. The use of a copper material, in particular of a copper alloy, is advantageous in order to transmit high currents with as little loss as possible. A high current-carrying capacity is thus provided. Alternatively, the contact rail may also be manufactured using other production processes. For example, it is possible to produce the contact rail by cold stamping.

The socket contacts can have contact springs for clamping the contact rails, in which the contact springs are arranged in a retaining cage. In particular, the contact springs can serve to clamp the socket-side ends of the contact rails. The use of contact springs provides a good electrical connection between the plug part or the contact rail and the socket part, in particular the socket contacts.

In this context, the retaining cage serves to maintain the stability of the contact springs. In particular, the retaining cage inhibits an excessive plastic deformation when the plug part is plugged into the socket part, which could have a negative effect on the electrical contact. In particular, the retaining cage provides a high contact normal force, and provides this over the entire service life of the plug-connection system.

In order to provide a good connection between the retaining cage and the socket contact, in one form the retaining cage is connected in a latched manner with the socket contact. The latch connection between the retaining cage and the socket contact inhibits the retaining cage from being removed from the contact springs. The plug part and the socket part can thus be separated from each other and plugged together multiple times, in which a good electrical and mechanical connection is provided even after multiple plugging processes.

Furthermore, the retaining cage can include at least one fold that surrounds a free end of the contact spring. The fold provides that the contact aperture is maintained. In addition, the fold of the retaining cage protects the contact springs from incorrect plugging processes. When the socket-side end of the contact rail is inserted into the socket contact, the socket-side end slides along the fold of the retaining cage. This inhibits a direct contact of the contact springs at their end side, which could lead to bending of the contact springs.

In a further form of the present disclosure, it is provided that the retaining cage is laterally slotted so that the contact rail and the socket contact can be connected to each other at right angles. In particular, the retaining cage can be slotted laterally such that the socket-side end of the contact rail can engage laterally in the socket contact. In this way a plug connection can be realized via a 90° angle.

Furthermore, the socket-side end of the contact rail can include a guide contour for the reduction of the plugging force during the connecting with the socket contact. In particular, the insertion contour can have at least one, in one form embossed, chamfer, and/or a tapered plastic cap. The insertion contour reduces the plugging force during the connecting of plug part and the socket part. This facilitates the contact of electrical conductors via the plug connection system.

The plug connection system described here is suitable for high voltage applications, in which voltages of at least 350 volts, and in one form 400 volts, and/or 800 volts are present. In addition, the plug connection system is suitable to handle high currents, in particular over 100 amps, and in one form up to 800 amps.

Such voltages and currents occur in battery electric motor vehicles. In this respect an associated aspect of the present disclosure includes specifying an electrified motor vehicle, in particular a battery electric motor vehicle, with an above described plug connection system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The different and exemplary features described above can be combined with one another in accordance with the present disclosure, insofar as this is technically expedient and suitable. This applies irrespective of whether the respective features are disclosed as device features and/or as method features. Further features, advantages, and forms of the present disclosure are shown in the following description of the Figures as well as in the exemplary forms shown in the Figures.

Figure 1:
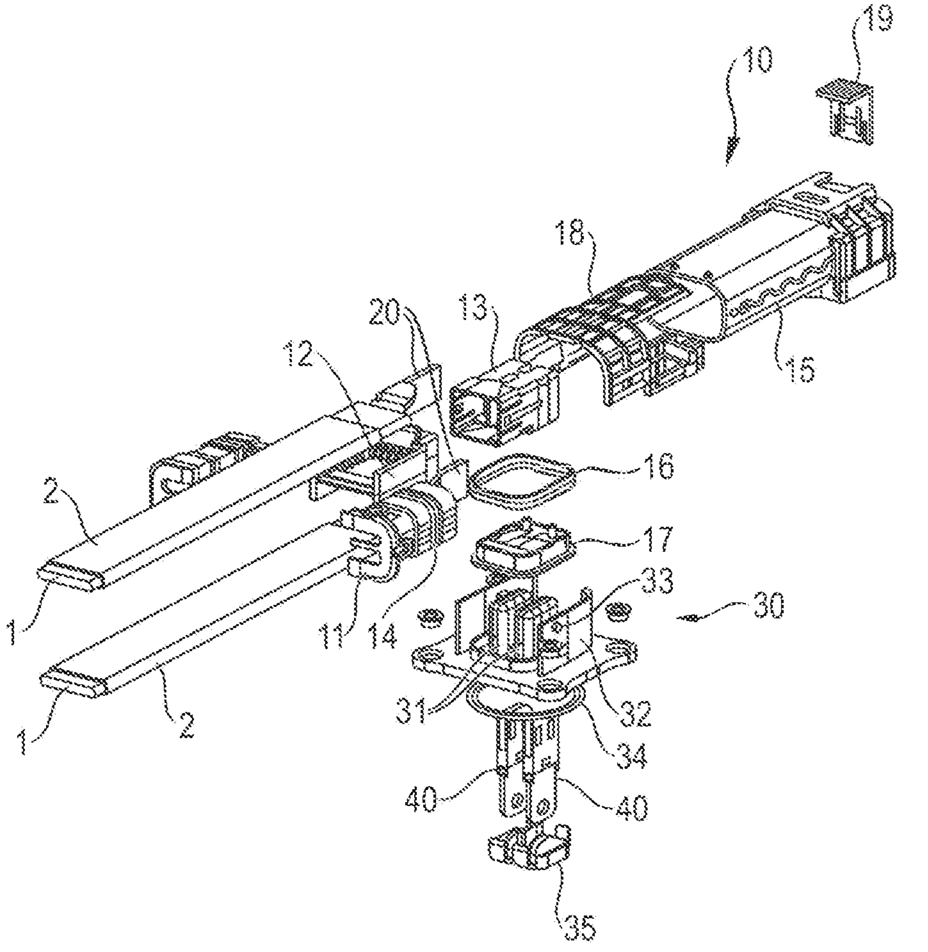
FIG. 1 shows an exploded perspective view of a plug connection system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an exploded view of the plug connection system that is provided for the mechanical and electrical connecting of flat conductors 1. The plug connection system is suitable for the mechanical and electrical connection of flat conductors 1 in a high voltage direct current connection of a battery electric motor vehicle.

The plug connection system comprises a plug part 10 and a socket part 30. The plug part 10 and the socket part 30 can be plugged together and locked, where the plug connection can be released and reconnected several times.

The plug part 10 includes a housing through-feed 11 for two flat conductors 1. The flat conductors 1 extend parallel to each other and are arranged with their flat sides opposite each other. In one form, the flat conductors 1 are arranged with their flat sides facing each other. Each flat conductor 1 is sheathed with an insulation 2. The housing through-feed 11 forms a housing cover that can be latched to the plug housing 15. An insulator 12 is arranged inside the plug housing 15 that is arranged between the flat conductors 1 and contact rails 20. The contact rails 20 are each welded to the flat conductors 1 at one end 21 on the conductor side.

For fixing the contact rails 20, an insulating cap 13 is provided, which in the installed state of the plug part 10 is slid over the contact rails 20 and the insulator 12. Furthermore, a seal system 14 is arranged on the conductor side that provides a liquid tight sealing of the plug part 10. The housing through-feed 11 fixes the seal system 14 in the plug housing 15.

The plug part 10 further comprises a housing seal 16 that seals a seal cover 17 with respect to the plug housing 15. A locking slide 18 is furthermore pushed over the plug housing 15; the locking slide 18 can be held in a locking position by a fixing element 19.

The socket part 30 comprises two contact receptacles 31 that each receive a socket contact 40. The contact receptacles 31 are surrounded by a receiving contour 32, in which the receiving contour 32 includes at least one, and in one form two locking lugs 33. The locking lugs 33 can interact with the locking slide 18 to mechanically provide the plug connection.

The plug connection is thus mechanically secured by sliding the locking slide 18 onto the locking lugs 33. In order to inhibit the locking slide 18 from leaving the locked position, the fixing element 19 fixes the locking position of the locking slide 18.

The locking part 30 further comprises a socket seal 34 and a socket cover 35, in which the socket cover 35 closes off the contact receptacles 31.

Figure 2:
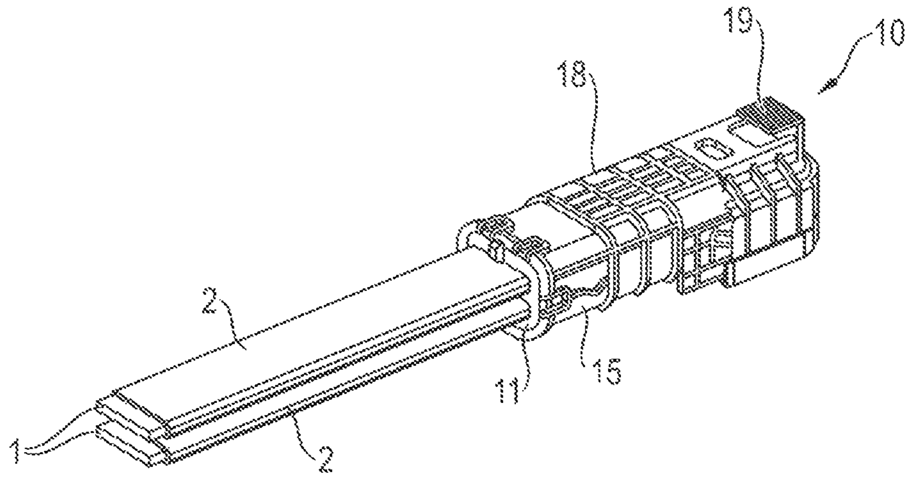
FIG. 2 shows a perspective view of a plug part of the plug connection system according to FIG. 1.

In FIG. 2 the plug part 10 is shown in an installed state. The parallel extension of the flat conductors 1 is clearly visible. The flat conductors 1 are guided in parallel through the housing through-feed 11 into the plug housing 15. The locking slide 18 and the fixing element 19 are each in their open position.

Figure 3:
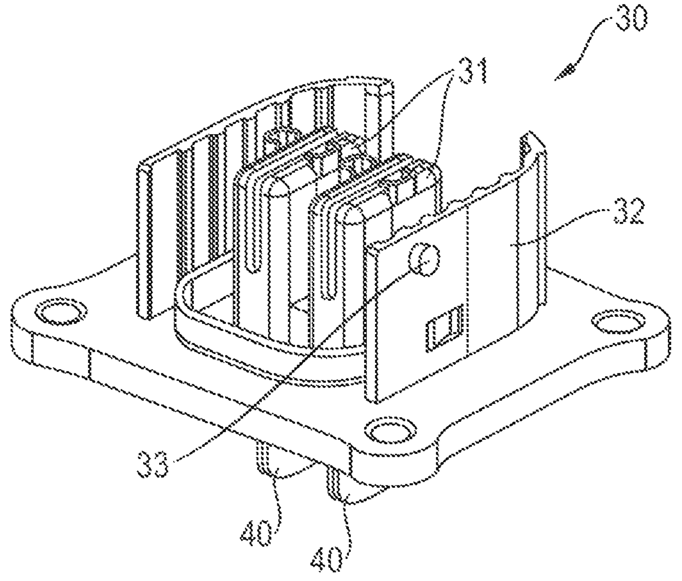
FIG. 3 shows a perspective view of a socket part of the plug connection system according to FIG. 1.

FIG. 3 shows the socket part 30 in detail. The locking lug 33 on the receiving contour 32 is visible. The two contact receptacles 31 that receive and hold the two socket contacts 40 are located Inside the receiving contour 32.

Figure 4:
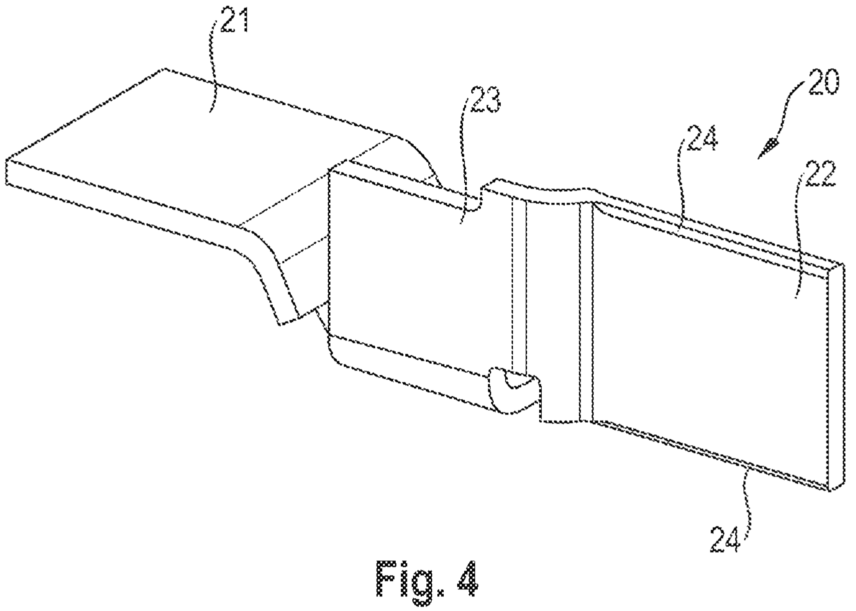
FIG. 4 shows a perspective view of a contact rail of the plug connection system according to FIG. 1.

The advantages of the plug connection system are realized by the design of the contact rails 20. One form of such a contact rail 20 is shown in FIG. 4. The contact rail 20 includes a conductor-side end 21 and a socket-side end 22. A deflection section 23 is located between the conductor-side end 21 and the socket-side end 22; the deflection section 23 is designed essentially L-shaped. As can be seen in FIG. 4, the contact rail 20 has a cross-section contour that essentially continuously corresponds to the cross-section contour of the flat conductor 1.

The conductor-side end 21 is arranged at a right angle with respect to the socket-side end 22. In this respect, the deflection section 23 serves as transition between the conductor-side end 21 and the socket-side end 22 arranged at right angles thereto. In FIG. 4 it can also be seen that the socket-side end 22 includes chamfers 24. The socket side end 22 is chamfered in order to facilitate the insertion of the socket-side end 22 into the socket contact 40. In one form the socket side end 22 of the contact rail 20 includes an insertion contour. In one variation the insertion contour is an embossed chamfer 24 to reduce an insertion force when connecting with the socket contact 40. In another variation the insertion contour is a tapering plastic cap to reduce an insertion force when connecting with the socket contact 40.

The contact rail 20 is, in one variation, a stamped and bent part and comprises a copper material in order to facilitate an electrical conduction. The flat conductors 1 may be made of aluminum. The connection between the flat conductor 1 and the contact rail 20 is, in one form, welded.

Figure 5:
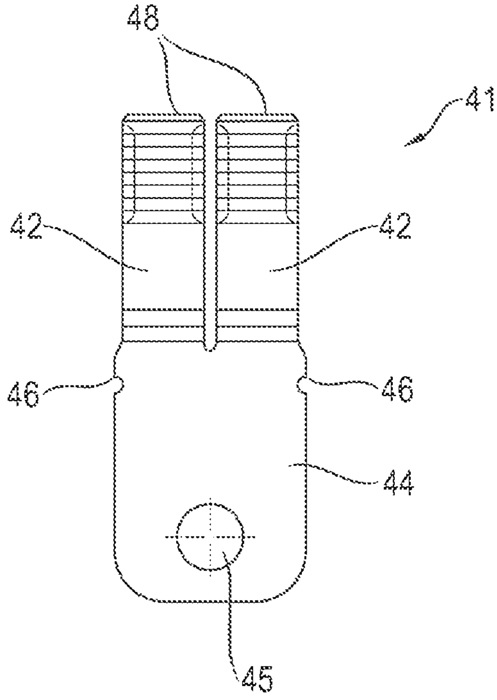
FIG. 5 shows a front view of a contact spring of a socket contact of the plug connection system according to FIG. 1.

FIG. 5 shows a contact spring 41 of a socket contact 40 in detail. The contact spring 41 comprises a flat section 44 and two arms 42 originating at the flat section 44. The arms 42 are, in one variation, identical. The design with two arms 42 permits the insertion of the contact rail 20 into the socket contact 40. The two arms 42 of the contact spring 41 can tolerate the socket-side end 22 of the contact spring 41 being slightly twisted or tilted, or being inserted eccentrically into the socket contact 40.

Close to the arms 42, two latching lugs 46 are provided on the flat section 44 whose function will be explained in more detail later. In addition, the flat section 44 of the contact spring 41 includes a bore 45. The socket contact 40 can be screw-connected by means of the bore 45, with a cable lug, for example.

Figure 6:
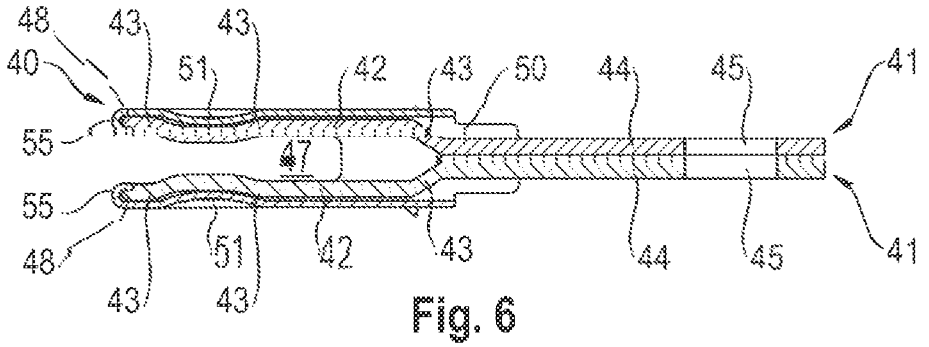
FIG. 6 shows a sectional view of the socket contact of the plug connection system according to FIG. 1.

In the sectional view according to FIG. 6, the construction of the socket contact 40 is visible. The socket contact 40, in one variation, comprises two contact springs 41 as are shown in FIG. 5. Here, the two contact springs 41 are essentially arranged mirrored to each other, so that their flat sections 44 are flush with each other. Here, the bores 45 are aligned with each other. In the sectional view according to FIG. 6, it is also shown that the arms 42 of the contact springs 41 include a plurality of offsets 43, so that a receiving gap 47 forms between the arms 42 of the opposing contact springs 41. The socket-side end 22 of the contact rail 20 can engage in the receiving gap 47.

The arms 42 of the contact springs 41 are enclosed by a retaining cage 50. The retaining cage 50 includes two folds 55 that each surround the free ends 48 of the contact springs 41. Each fold 55 respectively surrounds a free end 48 of a contact spring 41. On the one hand the fold 55 provides a guide for the socket-side end 22 of the contact rail 20 during the insertion into the receiving gap 47. On the other hand, the fold 55 protects the contact spring 41 from being deformed by the socket-side end 22 of the contact rail 20.

As can also be seen in FIG. 6, the receiving gap 47 is tapered in an area close to the respective free end 48. This is achieved by corresponding offsets 43 of the contact spring 41. A clamp connection is made in this area when the contact spring 41 is inserted, so that there is electrical contact between the contact springs 41 and the contact rail 20. The contact springs 41 are, in one variation, made of a copper material in order to achieve electrical conduction.

Figure 7:
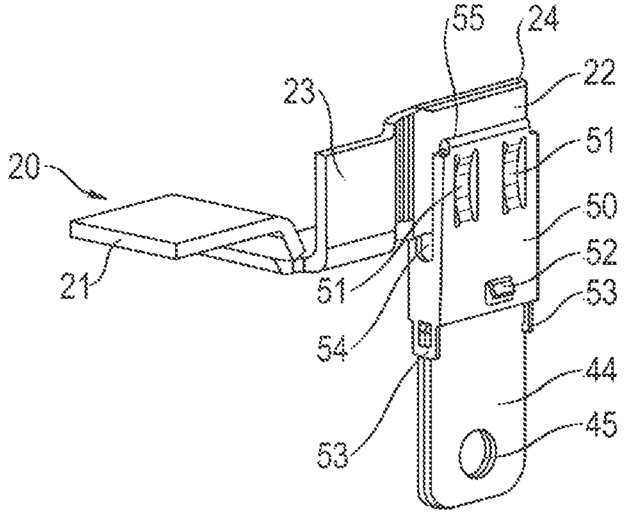
FIG. 7 shows a perspective view of the contact rail according to FIG. 4 connected with the socket contact according to FIGS. 5 and 6.

FIG. 7 shows the contact rail 20 in a plugged-in connection with the socket contact 40. The connection is made at right angles, in which the contact rail 20, in one variation the socket-side end 22 of the contact rail 20, projects laterally from the receiving gap 47.

The retaining cage 50 of the socket contact 40 has a total of four embossed springs 51, in which each embossed spring 51 interacts with an arm 42 of a contact spring 41. The embossed springs 51 rest directly on the contact springs 41 and provide the desired clamping force for the connection with the contact rail 20.

A retaining spring 42 can be seen below the embossed springs 51, with a retaining spring 42, in one variation, arranged on each side of the retaining cage 50. The retaining spring 42 is intended for primary locking of the socket contact 40 in the housing of the socket part 30.

Latching nibs 53 are also arranged laterally on the retaining cage 50. The latching nibs 53 interact with the latching lugs 46 of the contact springs 41 to firmly connect the retaining cage 50 with the contact springs 41. Above the latching nibs 53 the retaining cage 50 has a slot 54 that facilitates the contact rail 20 to engage laterally in the contact springs 41 or the receiving gap 47. The retaining cage 50 is, in one variation, made in one piece as a steel cage. In another variation the retaining cage 50 is formed from two assembled parts.

Figure 8:
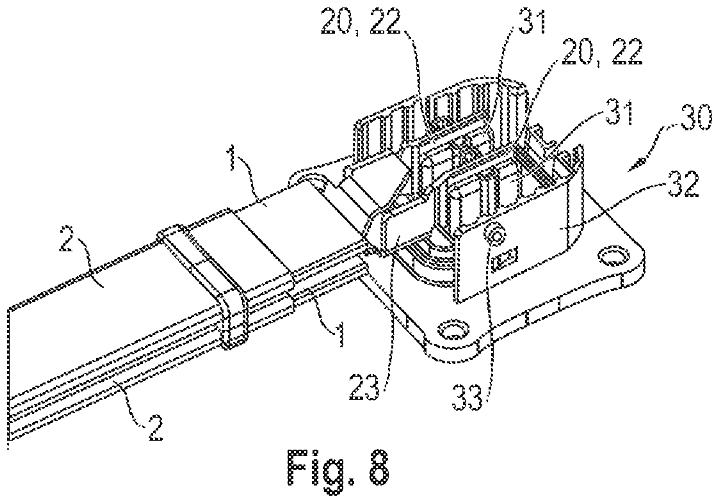
FIG. 8 shows a perspective view of the interior of the plug connection system of FIG. 1, in a plugged-in state according to the present disclosure.

FIG. 8 shows how the connection between the contact rails 20 and the socket part 30 is made. The connection is compact and stable. The parallelism of the current-carrying elements is maintained throughout, which results in electromagnetic compatibility of the plug connection.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A plug connection system for a mechanical and electrical connection of flat conductors, in particular of a high voltage direct current connection in a battery electric motor vehicle, the plug connection system comprises:

a plug part; and a socket part that includes two socket contacts arranged in parallel, wherein the plug part includes a housing through-feed for two parallel flat conductors arranged with flat sides of the two parallel flat conductors facing each other, and wherein the two parallel flat conductors in the plug part and the two socket contacts in the socket part are configured to be connected by parallel contact rails whose cross-section contour respectively corresponds to a cross-section contour of a flat conductor of the two parallel flat conductors.

2. The plug connection system according to claim 1, wherein each parallel contact rail includes:

a conductor-side end that is welded with a corresponding flat conductor of the two parallel flat conductors, and a socket-side end that is configured to be connected in a plugged manner to a respective socket contact of the two socket contacts.

3. The plug connection system according to claim 2, wherein the conductor-side end is aligned at right angles to the socket-side end of each of the parallel contact rails.

4. The plug connection system according to claim 3, wherein an L-shaped deflection section is arranged between the conductor-side end and the socket-side end.

5. The plug connection system according to claim 2, wherein the socket-side end of at least one of the parallel contact rails includes an insertion contour, wherein the insertion contour is an embossed chamfer.

6. The plug connection system according to claim 2, wherein the socket-side end of at least one of the parallel contact rails includes an insertion contour, wherein the insertion contour is a tapering plastic cap.

7. The plug connection system according to claim 2, wherein the two socket contacts include contact springs configured to clamp the parallel contact rails, wherein the contact springs are configured to clamp the socket-side ends of the parallel contact rails, wherein the contact springs are arranged in a retaining cage.

8. The plug connection system according to claim 7 wherein the retaining cage is latched to at least one of the two socket contacts.

9. The plug connection system according to claim 7, wherein the retaining cage includes at least one fold that surrounds a free end of the contact spring.

10. The plug connection system according to claim 7, wherein the retaining cage is laterally slotted, so that at least one of the parallel contact rails and at least one of the two socket contacts are configured to be connected to each other at right angles.

11. The plug connection system according to claim 1 wherein each parallel contact rail includes:

a conductor-side end that is welded with a corresponding flat conductor of the two parallel flat conductors, and a socket-side end that is configured to be clamped to a respective socket contact of the two socket contacts.

12. The plug connection system according to claim 1, wherein at least one of the parallel contact rails of the parallel contact rails is formed as a stamped and bent part, wherein the parallel contact rails comprise copper.

13. A battery electric motor vehicle with a plug connection system according to claim 1.

* * * * *